Figure 1:
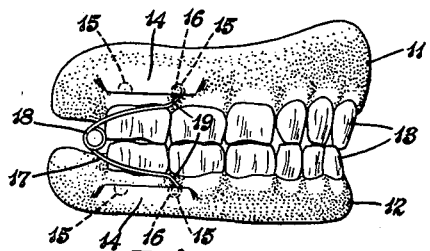

Jan. 26, 1954

R. W. MYERS 2,666,988

CONNECTED UPPER AND LOWER DENTURES

Filed June 12, 1952

INVENTOR.
Roy W. Myers
BY Frease & Bishop
ATTORNEYS

Patented Jan. 26, 1954

2,666,988

UNITED STATES PATENT OFFICE 2,666,988

CONNECTED UPPER AND LOWER DENTURES

Roy W. Myers, Uhrichsville, Ohio

Application June 12, 1952, Serial No. 293,075

7 Claims. (Cl. 32—4)

The invention relates to improvements in dental appliances and more particularly to means for maintaining removable dentures or dental plates securely positioned within the mouth.

Considerable inconvenience and embarrassment is frequently caused to persons wearing dental plates through accidental displacement of the plates. This is usually due to the fact that the plates do not fit snugly upon the gums, or the roof of the mouth, so that they do not always perform their function of holding the teeth in proper alignment.

The present invention comprises a simple means for forcibly holding the rear portions of the plates apart and in contact with the gums so as to prevent accidental displacement thereof.

An object of the invention is to provide spring means whereby the dentures or dental plates will be held in intimate contact with the gums at all times.

Another object is to provide such a device in which the spring means may be easily and readily removed from the dentures.

A further object is to provide such a device in which there is a ball and socket connection between the spring and the dental plates.

A still further object is to provide such a dental appliance in which the plates are provided with a plurality of sockets for selective engagement by the ball ends of the spring.

Figure 3:
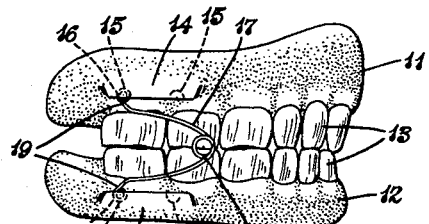
Figure 2:
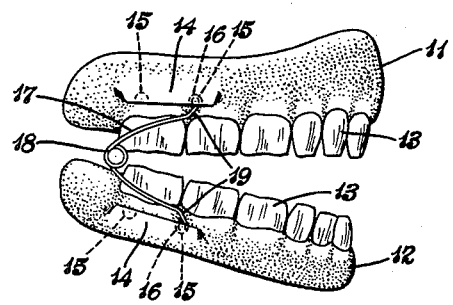
Figure 4:
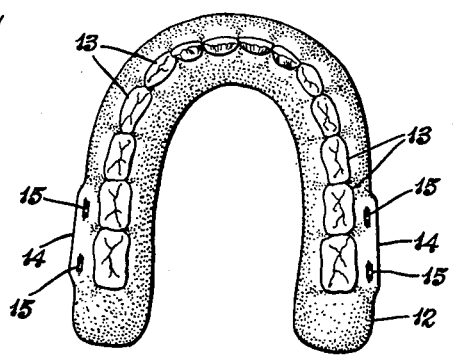
Figure 7:
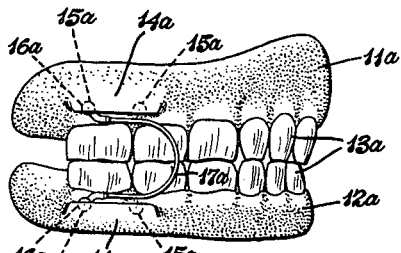
Figures 5, 6:
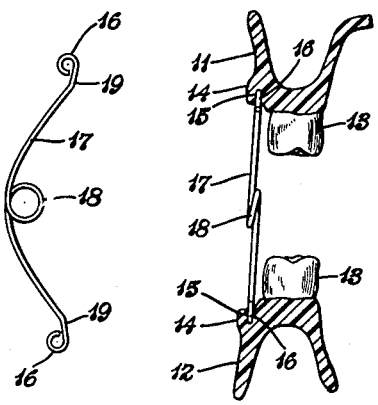
Figures 8, 9, 10:
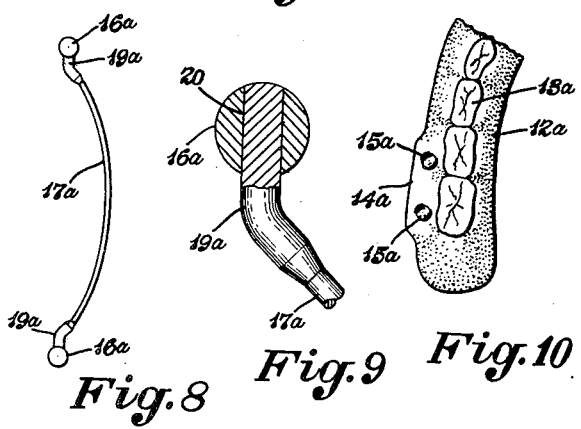

The above objects together with others which will be apparent from the drawing and following description, or which may be later referred to, may be attained by constructing the improved dental appliance in the manner hereinafter described in detail and illustrated in the accompanying drawing, in which;

Fig. 1 is a side elevation of a pair of dental plates equipped with the improved spring appliance, showing the same disposed rearwardly with relation to the dental plates which are in the normal or closed position;

Fig. 2 a view similar to Fig. 1 showing the dental plates in the open position;

Fig. 3 a view similar to Fig. 1 showing the improved spring appliance disposed forwardly relative to the dental plates;

Fig. 4 a top plan view of the lower dental plate showing the spaced sockets on each side thereof for receiving the ball ends of the spring appliance;

Fig. 5 an enlarged, fragmentary, vertical section through portions of the upper and lower dental plates, showing the plates in open position;

Fig. 6 a detached, side elevation of the spring appliance shown in Figs. 1 to 5;

Fig. 7 a side elevation of upper and lower dental plates in closed position showing a modified form of spring appliance;

Fig. 8 a detached, side elevation of the spring appliance shown in Fig. 7;

Fig. 9 an enlarged, fragmentary, sectional elevation of one end portion of the spring appliance shown in Fig. 8; and Fig. 10 a fragmentary, top plan view of one end portion of the lower plate shown in Fig. 7, showing the sockets for selective engagement with the ball ends of the spring appliance shown in Figs. 7 to 9.

Referring first to the construction illustrated in Figs. 1 to 6, in which similar numerals refer to similar parts throughout, an upper plate is indicated generally at 11 and a lower plate at 12, both being formed of suitable plastic material or the like, and each provided with teeth 13 of procelain, plastic material or the like embedded in the plates in usual and well known manner.

For the purpose of the invention a slight enlargement 14 is formed on each side of each of the upper and lower plates 11 and 12 near the rear ends of the plates, on the buccal or outer sides thereof.

Within each enlarged portion 14 is located a spaced pair of sockets 15, the sockets in each plate being opposed to the sockets in the other plate. These sockets are for the purpose of selectively receiving the rounded head portions 16 of the spring 17 which is preferably slightly bowed, as shown in the drawing, and may be provided with the central coil 18.

The head portions 16, at the ends of the spring, may be in the form of eyes formed integrally upon the spring, as shown in Figs. 1 to 6, and they are preferably angularly disposed relative to the spring, as indicated at 19, for the purpose of permitting the head portions 16 to be easily inserted into either of the sockets 15 in each plate.

If desired, the head portions of each spring may be inserted into the forward sockets of each plate, with the spring extending rearwardly therefrom as shown in Figs. 1 and 2, or if desired, these head portions may be inserted into the rearward sockets of each plate with the spring extending forwardly therefrom, as shown in Fig. 3. The wearer may thus attach the spring to the plates in either position which may be most comfortable and convenient.

With this arrangement of spring the plates may first be placed in the mouth and properly positioned upon the upper and lower gums as in usual manner, after which the springs may be easily attached thereto in the position desired.

These springs will exert a sufficient pressure upon the plates to urge them into snug contact with the gums and will hold the plates snugly in position as the mouth is opened, as shown in Fig. 2.

In Figs. 7 to 10 is shown a slightly modified form of the invention in which the plates 11a and 12a and teeth 13a may be substantially as above described and illustrated, the enlarged portions 14a at the sides of the plates having substantially semispherical sockets 15a therein, to receive the rounded heads in the form of spherical balls 16a upon the ends of the bowed spring 17a.

The ends of the spring may be angularly offset, as at 19a, in order that the balls may be easily inserted into the sockets in the plates. If desired, each ball 16a may be provided with a central aperture 20 to receive the angular end portions of the spring, being soldered or otherwise fixed thereto.

The spring 17a may be as shown in Figs. 7 and 8, or if desired, may have a central coil as shown at 18 in Figs. 1 to 6. Otherwise the operation and use of the device shown in Figs. 7 to 10 is the same as above described.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In combination with a pair of dental plates provided with teeth and having opposed sockets therein, a bowed spring having rounded heads at its ends for detachable engagement in said sockets, said rounded heads being in the form of eyes integrally formed upon the spring.

2. In combination with a pair of dental plates provided with teeth and having opposed sockets therein, a bowed spring having rounded heads at its ends for detachable engagement in said sockets, said rounded heads being spherical and said sockets being semi-spherical.

3. In combination with complementary upper and lower dental plates provided with teeth, there being a downwardly open rounded socket in the upper plate on the outer side of the rear portion thereof and an opposed upwardly open rounded socket in the lower plate, and a bowed spring having rounded heads at its ends, said heads being disposed upwardly and downwardly respectively for detachable engagement in the sockets of the upper and lower plates.

4. In combination with complementary upper and lower dental plates provided with teeth, there being a downwardly open rounded socket in the upper plate on the rear portion thereof and an opposed upwardly open rounded socket in the lower plate, and a bowed spring having rounded heads at its ends, said heads being disposed upwardly and downwardly respectively for detachable engagement in the sockets of the upper and lower plates.

5. In combination with complementary upper and lower dental plates provided with teeth, there being a spaced pair of downwardly open rounded sockets in the upper plate at the rear portion thereof and an opposed spaced pair of upwardly open sockets in the lower plate, and a bowed spring having rounded heads at its ends, said heads being disposed upwardly and downwardly respectively for selective detachable engagement in said sockets.

6. In combination with complementary upper and lower dental plates provided with teeth, there being a downwardly open rounded socket in the upper plate on the outer side of the rear portion thereof and an opposed upwardly open rounded socket in the lower plate, and a bowed spring having rounded heads at its ends, said heads being in the form of eyes integrally formed upon the spring and disposed upwardly and downwardly respectively for detachable engagement in the sockets of the upper and lower plates.

7. In combination with complementary upper and lower dental plates provided with teeth, there being a downwardly open rounded socket in the upper plate on the outer side of the rear portion thereof and an opposed upwardly open rounded socket in the lower plate, and a bowed spring having rounded heads at its ends, said heads being disposed upwardly and downwardly respectively for detachable engagement in the sockets of the upper and lower plates, said heads being spherical and said sockets being semi-spherical.

ROY W. MYERS.

References Cited in the file of this patent

UNITED STATES PATENTS

| Number | Name | Date |
|---|---|---|
| 1,473,673 | Elsas | Nov. 13, 1923 |
| 1,831,591 | Foerster | Nov. 10, 1931 |

FOREIGN PATENTS

| Number | Country | Date |
|---|---|---|
| 715,159 | Germany | Jan. 22, 1942 |